(12) United States Patent
Fu

(10) Patent No.: US 11,769,273 B2
(45) Date of Patent: Sep. 26, 2023

(54) PARAMETER OBTAINING METHOD AND TERMINAL DEVICE

(71) Applicant: VIVO MOBILE COMMUNICATION CO., LTD., Guangdong (CN)

(72) Inventor: Conghua Fu, Guangdong (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 130 days.

(21) Appl. No.: 17/503,545

(22) Filed: Oct. 18, 2021

(65) Prior Publication Data

US 2022/0036588 A1 Feb. 3, 2022

Related U.S. Application Data

(63) Continuation of application No. PCT/CN2020/085177, filed on Apr. 16, 2020.

(30) Foreign Application Priority Data

Apr. 26, 2019 (CN) .......................... 201910343628.4

(51) Int. Cl.
*G06T 7/80* (2017.01)
*H04N 23/63* (2023.01)
*H04N 23/67* (2023.01)

(52) U.S. Cl.
CPC ............. *G06T 7/80* (2017.01); *H04N 23/635* (2023.01); *H04N 23/671* (2023.01)

(58) Field of Classification Search
CPC ................... G06T 7/80; G06T 2200/24; G06T 2207/10016; H04N 23/635; H04N 23/671; H04N 23/64; H04N 23/67; H04N 23/62; H04N 17/002
See application file for complete search history.

(56) References Cited

U.S. PATENT DOCUMENTS

| | | | |
|---|---|---|---|
| 7,701,567 B2 | 4/2010 | Chow | |
| 10,062,180 B2* | 8/2018 | Shirakyan | ............... G06T 5/001 |
| 10,560,679 B2* | 2/2020 | Zhao | ..................... H04N 13/128 |
| 2007/0286590 A1 | 12/2007 | Terashima | |
| 2012/0105585 A1* | 5/2012 | Masalkar | ................ G06F 3/017 |
| | | | 348/46 |
| 2012/0229628 A1 | 9/2012 | Ishiyama et al. | |
| 2013/0256411 A1 | 10/2013 | Schuler et al. | |

(Continued)

FOREIGN PATENT DOCUMENTS

| CN | 101086598 A | 12/2007 |
|---|---|---|
| CN | 102597693 A | 7/2012 |

(Continued)

*Primary Examiner* — Shahbaz Nazrul
(74) *Attorney, Agent, or Firm* — Price Heneveld LLP

(57) ABSTRACT

This disclosure provides a parameter obtaining method and a terminal device, and relates to the field of communications technologies, to resolve a problem that calibration of a distance sensor is relatively complex. The method includes: obtaining a preview image of a target object in a shooting preview screen; obtaining a first measurement value of a distance sensor when a degree of coincidence between the preview image and a calibration area in the shooting preview screen exceeds a threshold; and obtaining a calibration offset corresponding to the target object based on the first measurement value and the calibration distance.

20 Claims, 8 Drawing Sheets

(56) References Cited

U.S. PATENT DOCUMENTS

| | | |
|---|---|---|
| 2014/0307126 A1 | 10/2014 | Son et al. |
| 2015/0055085 A1 | 2/2015 | Fonte et al. |
| 2016/0061586 A1 | 3/2016 | Broga et al. |
| 2016/0335495 A1 | 11/2016 | Kim et al. |
| 2017/0234974 A1 | 8/2017 | Mochizuki |

FOREIGN PATENT DOCUMENTS

| | | |
|---|---|---|
| CN | 203151603 U | 8/2013 |
| CN | 105245790 A | 1/2016 |
| CN | 105866781 A | 8/2016 |
| CN | 105874473 A | 8/2016 |
| CN | 109154647 A | 1/2019 |
| CN | 109257539 A | 1/2019 |
| CN | 110113528 A | 8/2019 |

\* cited by examiner

PARAMETER OBTAINING METHOD AND TERMINAL DEVICE

CROSS-REFERENCE TO RELATED APPLICATIONS

This application is a continuation of PCT Application No. PCT/CN2020/085177 filed on Apr. 16, 2020, which claims priority to Chinese Patent Application No. 201910343628.4, filed in China on Apr. 26, 2019, which are incorporated herein by reference in their entireties

TECHNICAL FIELD

Embodiments of this disclosure relate to the field of communications technologies, and in particular, to a parameter obtaining method and a terminal device.

BACKGROUND

With the advancement of sensor technologies, cameras of some electronic products can use a distance sensor to measure a distance of a focused object in order to achieve more accurate focusing. For example, a currently popular solution is to use a time of flight (ToF) technology to measure a straight-line distance between an object in focus and a camera, which is the distance of the focused object.

Although distance sensors based on technologies such as ToF have relatively high ranging accuracy, they have poor adaptability to environment. Ranging accuracy of distance sensors needs to be calibrated not only before an electronic product leaves the factory, but also after the electronic product is repaired, or used for a period of time. However, the calibration of the distance sensor is a highly professional task, which has strict requirements on skills of an operator, a calibration device, and a calibration environment. Therefore, this makes the calibration of the distance sensor relatively complex.

SUMMARY

Embodiments of this disclosure provide a parameter obtaining method and a terminal device, to resolve a problem that calibration of a distance sensor is relatively complex.

According to a first aspect, an embodiment of this disclosure provides a parameter obtaining method, applied to a terminal device, where the method includes:
  obtaining a preview image of a target object in a shooting preview screen;
  obtaining a first measurement value of a distance sensor when a degree of coincidence between the preview image and a calibration area in the shooting preview screen exceeds a threshold;
  obtaining a calibration distance between the target object and the terminal device; and
  obtaining a calibration offset corresponding to the target object based on the first measurement value and the calibration distance.

According to a second aspect, an embodiment of this disclosure provides a terminal device, including:
  a first obtaining module, configured to obtain a preview image of a target object in a shooting preview screen;
  a second obtaining module, configured to obtain a first measurement value of a distance sensor when a degree of coincidence between the preview image and a calibration area in the shooting preview screen exceeds a threshold;
  a third obtaining module, configured to obtain a calibration distance between the target object and the terminal device; and
  a fourth obtaining module, configured to obtain a calibration offset corresponding to the target object based on the first measurement value and the calibration distance.

According to a third aspect, an embodiment of this disclosure further provides a terminal device, including a memory, a processor, and a computer program stored on the memory and capable of running on the processor. When the computer program is executed by the processor, steps of the parameter obtaining method are implemented.

According to a fourth aspect, an embodiment of this disclosure further provides a computer-readable storage medium, where the computer-readable storage medium stores a computer program, and when the computer program is executed by a processor, steps of the parameter obtaining method are implemented.

In the embodiments of this disclosure, matching is performed between the preview image of the target object and the calibration area in the shooting preview screen, the measurement value of the distance sensor at this time is obtained, and then the measurement value and the calibration distance are used to obtain the calibration offset corresponding to the target object. Therefore, according to the embodiments of this disclosure, a user can use any target object and obtain its calibration offset, and the obtaining method is simple, thereby reducing complexity of calibrating the distance sensor.

DETAILED DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

Figure 1:
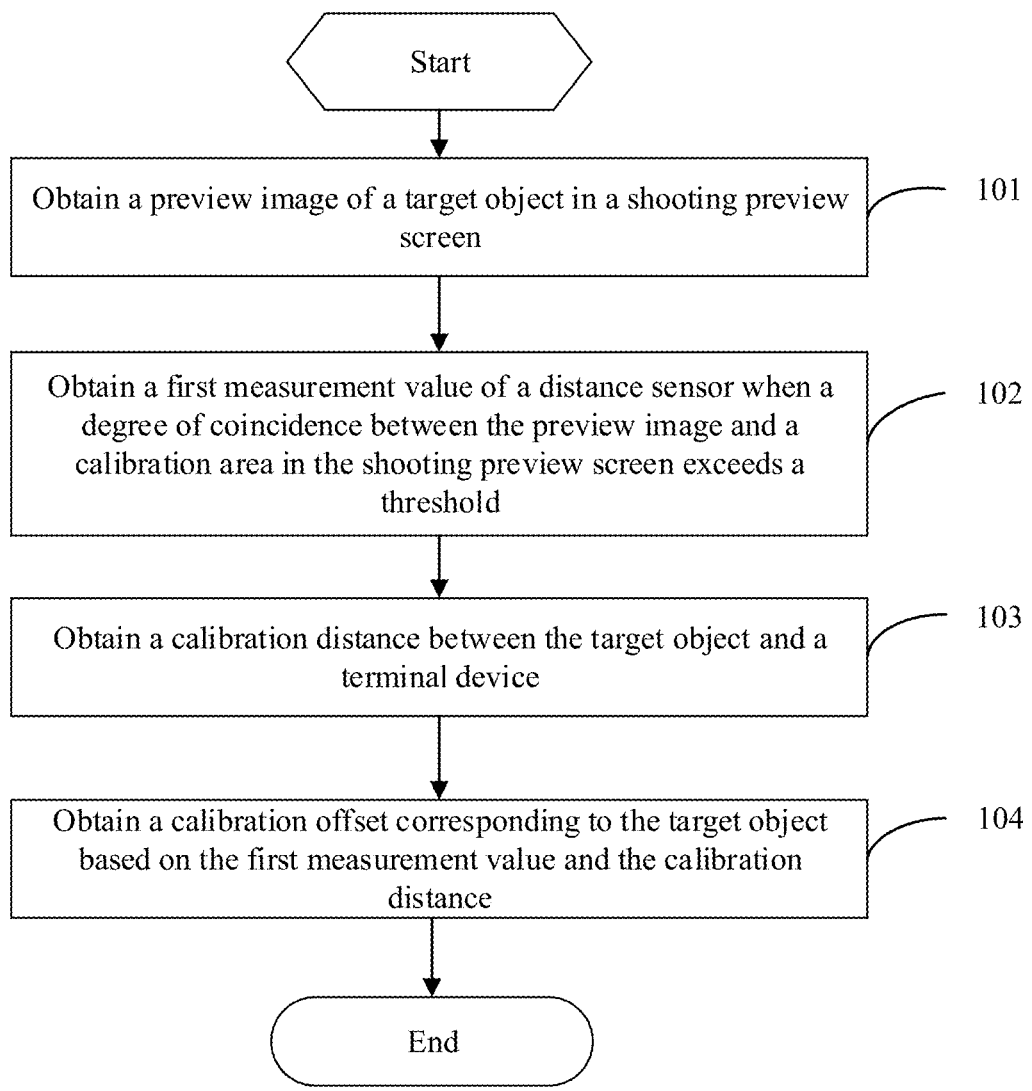
FIG. 1 is a flowchart of a parameter obtaining method according to an embodiment of this disclosure.

Referring to FIG. 1, FIG. 1 is a flowchart of a parameter obtaining method according to an embodiment of this disclosure. As shown in FIG. 1, the following steps are included.

Step 101: Obtain a preview image of a target object in a shooting preview screen.

When a camera function is enabled, a terminal device displays a shooting preview screen. At this time, a camera may be used to obtain an image of the target object in the shooting preview screen, and the image is referred to herein as the preview image of the target object. The preview image may include the target object, and may further include content such as an environment of the target object. The target object may be an object, a person, or the like.

Optionally, in this embodiment of this disclosure, what kind of object the target object is may be preset. Then, when a user uses an object for calibration, it may be first identified whether the object used by the user is a predetermined target object. If the object used by the user is a predetermined target object, step 101 is performed. Otherwise, the process may be ended, or the user may be prompted.

Step 102: Obtain a first measurement value of a distance sensor when a degree of coincidence between the preview image and a calibration area in the shooting preview screen exceeds a threshold.

A distance sensor based on ToF technology is taken as an example to briefly describe the principle of ranging. The ToF-based distance sensor usually includes an emitting unit and a receiving unit. A laser ray emitted by the emitting unit is reflected back after striking the target object, and the reflected light ray is received by the receiving unit. In this case, time of flight between emission and reception of the laser ray can be measured. Then, a distance, namely, the first measurement value, between the terminal device (or the distance sensor) and the target object can be calculated based on the propagation speed of light.

In this step, the threshold may be set to any value. In order to increase accuracy of the calibration, the threshold may be set to 100%. Then, in this case, the preview image coincides with the calibration area in the shooting preview screen.

The calibration area may be an area of any shape. For example, the calibration area may be rectangular or circular or the like. For example, the calibration area may be set to be of any shape and size to correspond to the shape and size of a specific target object.

Step 103: Obtain a calibration distance between the target object and the terminal device.

For a target object, its size is known or can be obtained by measurement. For an object of a fixed size, when the object is closer to the camera, the object has a larger image size on a display screen, and vice versa.

Based on the size of the target object, a geometric figure corresponding to its imaging contour may be displayed on the display screen. The size and dimensions of the geometric figure are fixed and are also known conditions. When the image of the target object coincides with the geometric figure, it may be considered that the sizes of the two are the same. In this case, a true distance between the target object and the distance sensor can be obtained based on experimental data, and the true distance is the calibration distance.

In practical applications, a correspondence may be stored which is a correspondence between objects and calibration distances between objects and the terminal device. Then, in this step, the target object may be identified, and then based on the correspondence between objects and calibration distances, the calibration distance between the target object and the terminal device is obtained. A method of identifying the target object is not limited herein.

Step 104: Obtain a calibration offset corresponding to the target object based on the first measurement value and the calibration distance.

Herein, a difference between the first measurement value and the calibration distance is used as the calibration offset corresponding to the target object.

In this embodiment of this disclosure, the foregoing method may be applied to the terminal device, for example: a mobile phone, a tablet personal computer, a laptop computer, a personal digital assistant (PDA), a mobile Internet device (MID), or a wearable device.

In this embodiment of this disclosure, matching is performed between the preview image of the target object and the calibration area in the shooting preview screen, the measurement value of the distance sensor at this time is obtained, and then the measurement value and the calibration distance are used to obtain the calibration offset corresponding to the target object. Therefore, according to the embodiments of this disclosure, a user can use any target object and obtain its calibration offset, and the obtaining method is simple, thereby reducing complexity of calibrating the distance sensor.

On the basis of the foregoing embodiment, after step 104, the method may further include: obtaining a second measurement value of the distance sensor; and obtaining a calibrated second measurement value based on the second measurement value and the calibration offset. Specifically, the difference between the second measurement value and the calibration offset is used as the calibrated second measurement value. In this way, the calculation is simple, and therefore the calibration work can be completed quickly.

On the basis of the foregoing embodiment, before step 101, the method may further include: identifying the target object; and displaying, in the shooting preview screen, a calibration area that matches a shape of the target object. Specifically, the target object may be identified, and the calibration area that matches the shape of the target object is displayed in the shooting preview screen. For example, a correspondence between an object and a calibration area may be stored. After an object is identified, its corresponding calibration area may be obtained according to the correspondence and then displayed. Herein, the target object does not need to be predetermined, thereby facilitating the calibration. For example, when the target object is identified as a coin, a calibration area that matches the shape (such as a circle) of the coin may be displayed in the shooting preview screen.

On the basis of the foregoing embodiment, after step 101, at least one of the following steps may be performed:

First prompt information is displayed, where the first prompt information is used to prompt a user to move the target object so that the preview image coincides with the calibration area. In this way, the time required for the calibration can be reduced and the calibration efficiency can be improved.

Second prompt information is displayed, where the second prompt information is used to prompt the user to select a target object with preset characteristics. The preset characteristics may be shape characteristics, type characteristics, or the like. In this way, the user can select the target object more quickly, thereby reducing the time required for the calibration and improving the calibration efficiency.

Figure 2:
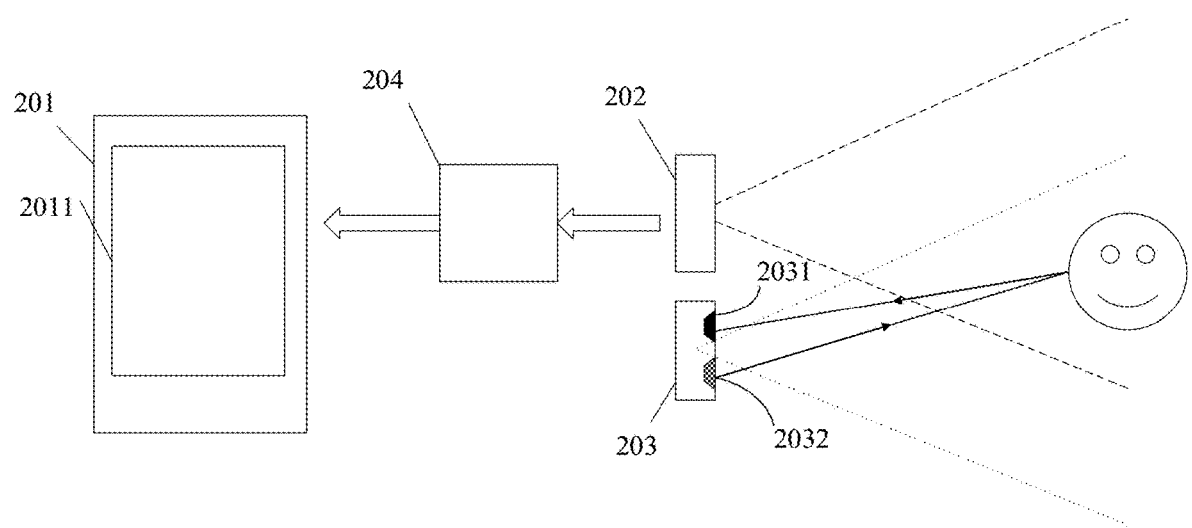
FIG. 2 is a first structural diagram of a terminal device according to an embodiment of this disclosure.

As shown in FIG. 2, the terminal device in this embodiment of this disclosure may include: a display 201, a camera module 202, a distance sensor 203, and a processor 204. The distance sensor 203 may include a receiving unit 2031 and an emitting unit 2032. A shooting preview screen 2011 is displayed on the display.

A distance sensor based on ToF technology is taken as an example to briefly describe the principle of ranging. A laser ray emitted by the emitting unit is reflected back after striking the target object, and the reflected light ray is received by the receiving unit. In this case, time of flight between emission and reception of the laser ray can be measured. Then, a distance between the terminal device (or the distance sensor) and the target object can be calculated based on the propagation speed of light.

Figure 3:
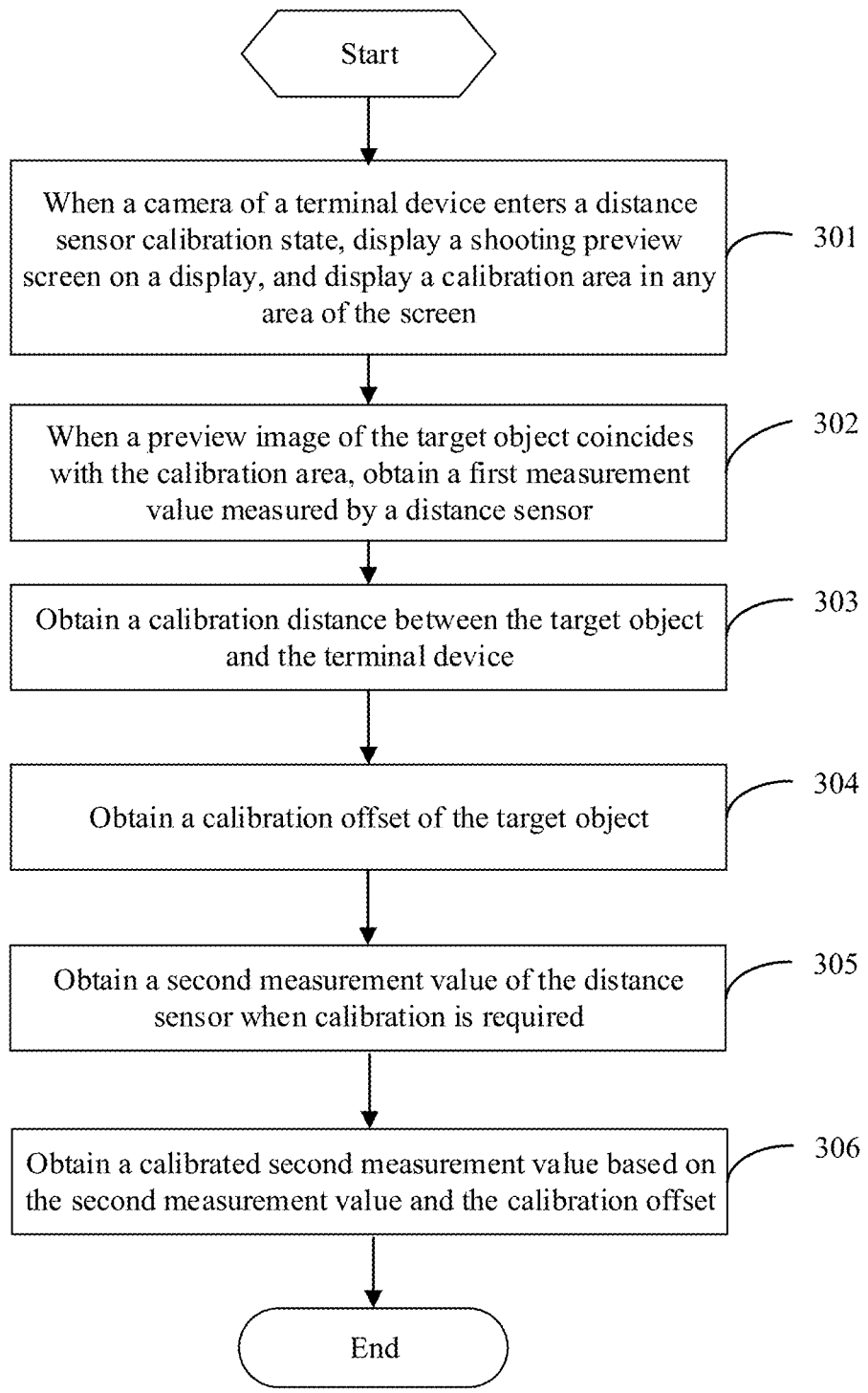
FIG. 3 is a first flowchart of a calibration method according to an embodiment of this disclosure.

Referring to FIG. 3, FIG. 3 is a flowchart of a calibration method according to an embodiment of this disclosure. The method may be applied to a terminal device. In this embodiment, a shape of a calibration area and a target object are preset. For example, the target object is a circular object having the size of a 1 Yuan coin. Accordingly, the shape of the calibration area is circular. As shown in FIG. 3, the method includes the following steps.

Step 301: When a camera of the terminal device enters a distance sensor calibration state, display a shooting preview screen on a display, and display a calibration area in any area of the screen.

Figure 4:
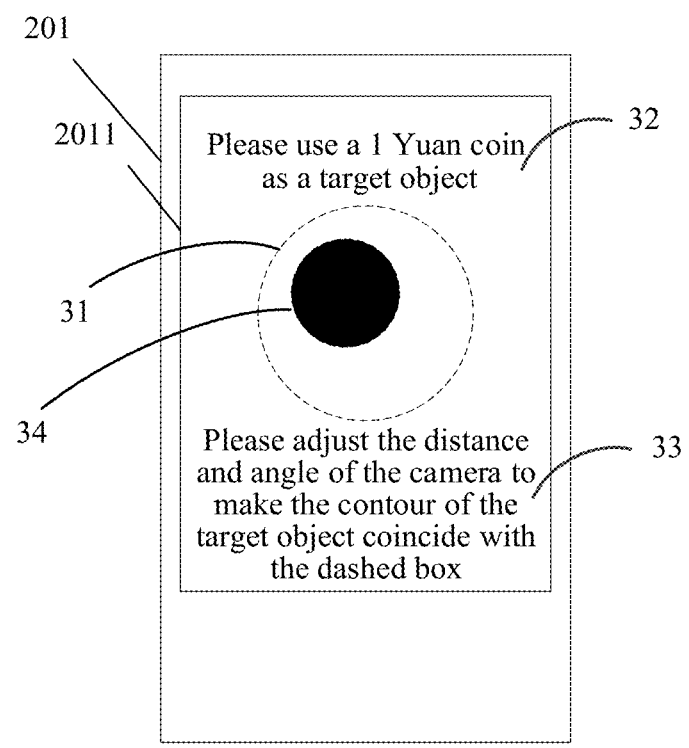
FIG. 4 shows a first display interface of a terminal device according to an embodiment of this disclosure.

In this embodiment of this disclosure, at least one preset geometric FIG. 31 (a circle in this embodiment) is displayed in the shooting preview screen 2011. In this case, a schematic diagram of the screen of the terminal device is shown in FIG. 4.

Optionally, to help a user to understand a target object corresponding to the geometric figure, prompt information 32 may be displayed on the display. For example, as shown in FIG. 4, "Please use a 1 Yuan coin as a target object" may be displayed.

Step 302: When a preview image of the target object coincides with the calibration area, obtain a first measurement value measured by a distance sensor.

In this process, when a preview image of an object appears in the shooting preview screen, it may be first identified whether the object that appears is a set target object. If the object is a set target object, step 302 is performed; otherwise, the user is prompted to use a corresponding object as the target object or use an object having a similar shape as the target object.

The user may operate to make an image 34 of the target object coincide with the geometric figure. Optionally, for purpose of guiding the user to operate, prompt information 33 may be displayed on the display. For example, as shown in FIG. 4, "Please adjust the distance and angle of the camera to make the contour of the target object coincide with the dashed box" may be displayed. When the target object coincides with the calibration area, a first measurement value D1 measured by the distance sensor is obtained.

Step 303: Obtain a calibration distance between the target object and the terminal device.

In this embodiment of this disclosure, a calibration offset of the target object may also be determined through experiments. The size and dimensions of the preset target object (such as a 1 Yuan coin) are uniform. For a target object of a fixed size, when the target object is closer to the camera, the target object has a larger image size on the display, and vice versa. The preset geometric figure is used as an imaging contour corresponding to the target object, and its size and dimensions are fixed and are known conditions. Therefore, when the image of the target object coincides with the geometric figure, it may be considered that the sizes of the two are the same. In this case, a true distance between the target object and the distance sensor can be obtained based on experimental data. This true distance is a calibration distance D0 preset by a system for the target object.

Step 304: Obtain a calibration offset of the target object.

Herein, Doffset=D1−D0 may be used as the calibration offset. The calibration offset may be stored and used for subsequent calibration.

Step 305: Obtain a second measurement value of the distance sensor when calibration is required.

When calibration is required, and the user uses a 1 Yuan coin as a target object, a second measurement value D2 of the distance sensor is obtained.

Step 306: Obtain a calibrated second measurement value based on the second measurement value and the calibration offset.

The second measurement value is calibrated by using the calibration offset. Herein, D2−Doffset, namely, a difference between the second measurement value and the calibration offset, is the calibrated second measurement value.

Figure 5:
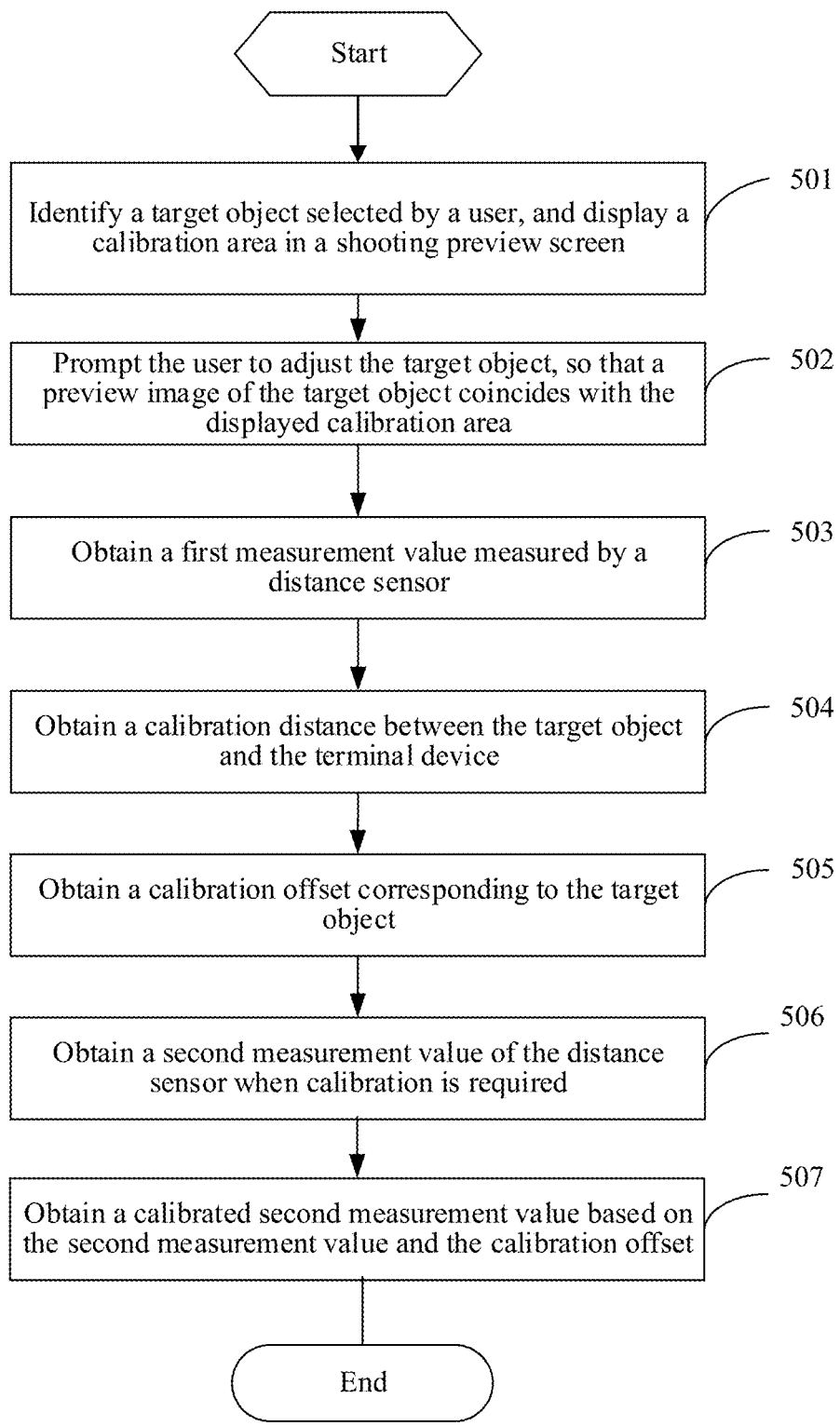
FIG. 5 is a second flowchart of a calibration method according to an embodiment of this disclosure.

Referring to FIG. 5, FIG. 5 is a flowchart of a calibration method according to an embodiment of this disclosure. The method may be applied to a terminal device. A difference from the embodiment shown in FIG. 3 is that in this embodiment of this disclosure, an individual target object is no longer preset, but a target object selected by a user may be identified, and a corresponding calibration area (such as a geometric figure) is displayed on a display screen based on an identification result. As shown in FIG. 5, the method includes the following steps.

Step 501: Identify a target object selected by a user, and display a calibration area in a shooting preview screen.

When a camera is pointed at the target object selected by the user, the target object enters an FoV range of the camera. The terminal device can distinguish, based on imaging characteristics of the target object, which type the target object belongs to, and then display a geometric figure corresponding to the target object on the preview screen.

Figure 6:
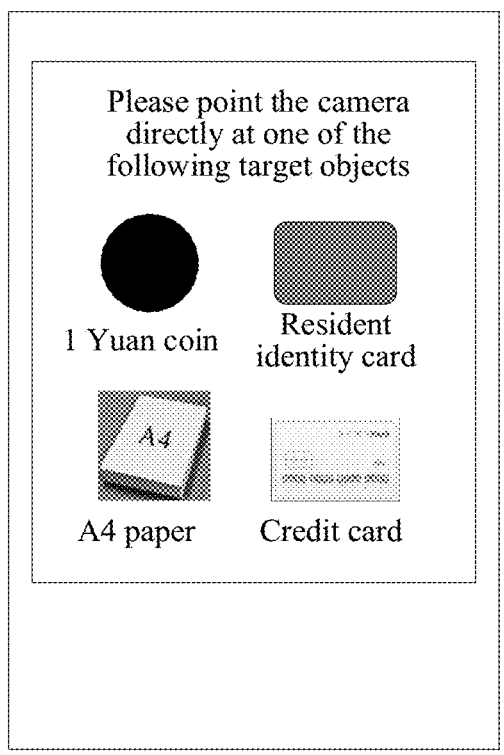
FIG. 6 shows a second display interface of a terminal device according to an embodiment of this disclosure.
Figure 7:
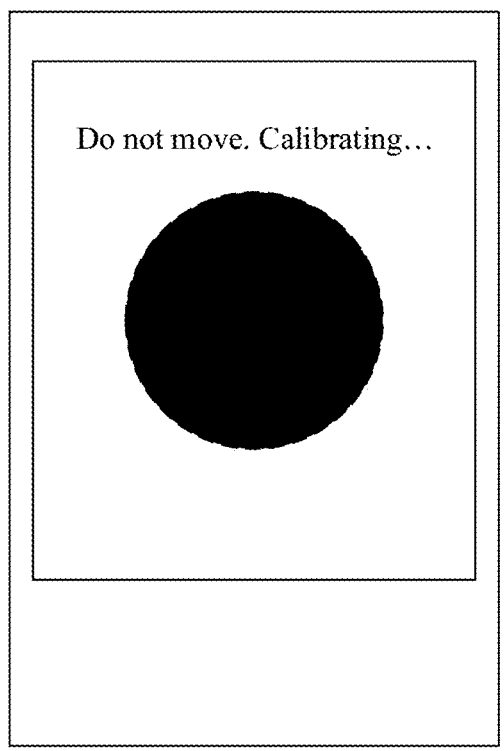
FIG. 7 shows a third display interface of a terminal device according to an embodiment of this disclosure.

As shown in FIG. 6, target objects that can be used may be prompted to the user. When the target object selected by the user is a 1 Yuan coin, the geometric figure displayed in the shooting preview screen is a circle; and when the target object is a resident identity card, the geometric figure displayed in the shooting preview screen is a rectangle.

Step 502: Prompt the user to adjust the target object, so that a preview image of the target object coincides with the displayed calibration area.

Step 503: Obtain a first measurement value D1 measured by a distance sensor.

Step 504: Obtain a calibration distance between the target object and the terminal device.

In this embodiment of this disclosure, a calibration offset of the target object may also be determined through experiments. The size and dimensions of the preset target object (such as a 1 Yuan coin) are uniform. For a target object of a fixed size, when the target object is closer to the camera, the target object has a larger image size on the display, and vice versa. The preset geometric figure is used as an imaging contour corresponding to the target object, and its size and dimensions are fixed and are known conditions. Therefore, when the image of the target object coincides with the geometric figure, it may be considered that the sizes of the two are the same. In this case, a true distance between the target object and the distance sensor can be obtained based on experimental data. This true distance is a calibration distance D0 preset by a system for the target object.

Step 505: Obtain a calibration offset corresponding to the target object.

Herein, Doffset=D1−D0 may be used as the calibration offset. The calibration offset may be stored for use in subsequent calibration.

Step 506: Obtain a second measurement value of the distance sensor when calibration is required.

When calibration is required, and for example, the user uses a 1 Yuan coin as a target object, a second measurement value D2 of the distance sensor is obtained.

Step 507: Obtain a calibrated second measurement value based on the second measurement value and the calibration offset.

The second measurement value is calibrated by using the calibration offset. Herein, D2−Doffset, namely, a difference between the second measurement value and the calibration offset, is the calibrated second measurement value.

It can be learned from the foregoing description that in this embodiment of this disclosure, the distance sensor may be calibrated according to the target object selected by the user, thereby simplifying the difficulty of calibration, facilitating operation by the user, and improving user experience.

Figure 8:
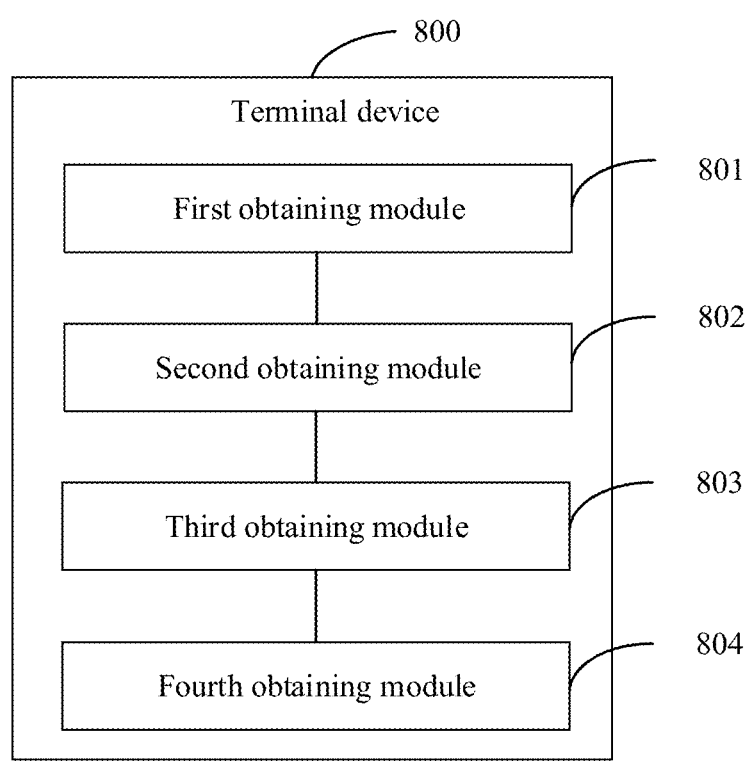
FIG. 8 is a second structural diagram of a terminal device according to an embodiment of this disclosure.

Referring to FIG. 8, FIG. 8 is a structural diagram of a terminal device according to an embodiment of this disclosure. As shown in FIG. 8, the terminal device 800 includes:

a first obtaining module 801, configured to obtain a preview image of a target object in a shooting preview screen; a second obtaining module 802, configured to obtain a first measurement value of a distance sensor when a degree of coincidence between the preview image and a calibration area in the shooting preview screen exceeds a threshold; a third obtaining module 803, configured to obtain a calibration distance between the target object and the terminal device; and a fourth obtaining module 804, configured to obtain a calibration offset corresponding to the target object based on the first measurement value and the calibration distance.

Optionally, the fourth obtaining module 804 is specifically configured to use a difference between the first measurement value and the calibration distance as the calibration offset.

Optionally, the third obtaining module 803 includes: an identification submodule, configured to identify the target object; and an obtaining submodule, configured to obtain the calibration distance between the target object and the terminal device based on a correspondence between objects and calibration distances.

Optionally, the terminal device further includes:
a fifth obtaining module 805, configured to obtain a second measurement value of the distance sensor; and
a calibration module 806, configured to obtain a calibrated second measurement value based on the second measurement value and the calibration offset.

Optionally, the calibration module 806 is specifically configured to use a difference between the second measurement value and the calibration offset as the calibrated second measurement value.

Optionally, the terminal device further includes:
an identification module 807, configured to identify the target object; and
a first display module 808, configured to display, in the shooting preview screen, the calibration area that matches a shape of the target object.

Optionally, the terminal device further includes at least one of the following modules:
a second display module 809, configured to display first prompt information, where the first prompt information is used to prompt a user to move the target object so that the preview image coincides with the calibration area; and
a third display module 810, configured to display second prompt information, where the second prompt information is used to prompt the user to select a target object with preset characteristics.

The terminal device 800 can implement processes implemented by the terminal device in the foregoing method embodiments. To avoid repetition, details are not described herein again.

In this embodiment of this disclosure, matching is performed between the preview image of the target object and the calibration area in the shooting preview screen, the measurement value of the distance sensor at this time is obtained, and then the measurement value and the calibration distance are used to obtain the calibration offset corresponding to the target object. Therefore, according to the embodiments of this disclosure, a user can use any target object and obtain its calibration offset, and the obtaining method is simple, thereby reducing complexity of calibrating the distance sensor.

Figure 9:
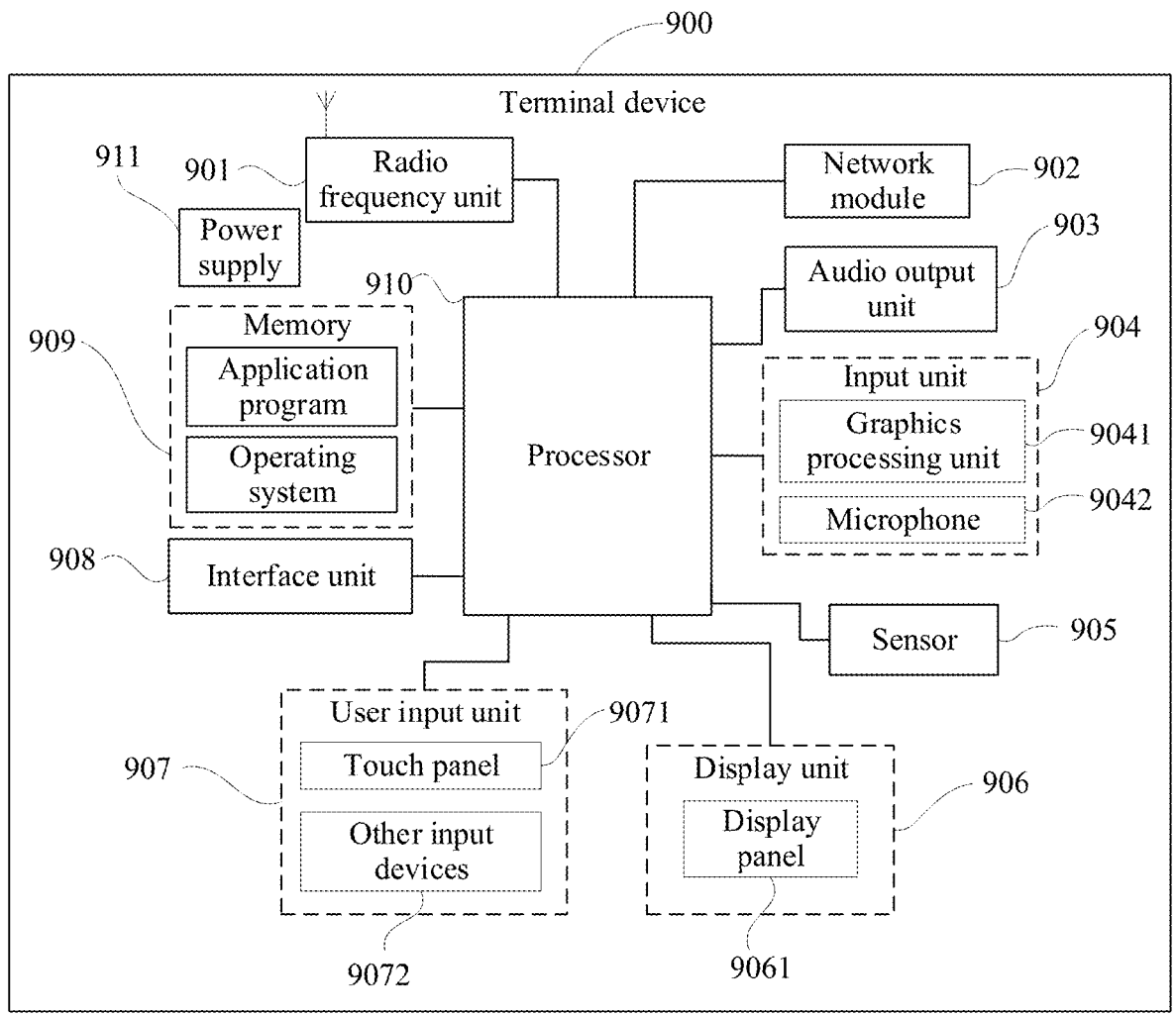
FIG. 9 is a third structural diagram of a terminal device according to an embodiment of this disclosure.

FIG. 9 is a schematic diagram of a hardware structure of a terminal device implementing the embodiments of this disclosure. The terminal device 900 includes but is not limited to: a radio frequency unit 901, a network module 902, an audio output unit 903, an input unit 904, a sensor 905, a display unit 906, a user input unit 907, an interface unit 908, a memory 909, a processor 910, a power supply 911, and other components. A person skilled in the art may understand that a structure of the terminal device shown in FIG. 9 does not constitute a limitation to the terminal device, and the terminal device may include more or fewer components than those shown in the figure, or combine some components, or have different component arrangements. In this embodiment of this disclosure, the terminal device includes but is not limited to a mobile phone, a tablet computer, a laptop computer, a palmtop computer, a vehicle-mounted mobile terminal, a wearable device, a pedometer, or the like.

The processor 910 is configured to: obtain a preview image of a target object in a shooting preview screen; obtain a first measurement value of a distance sensor when a degree of coincidence between the preview image and a calibration area in the shooting preview screen exceeds a threshold; obtain a calibration distance between the target object and the terminal device; and obtain a calibration offset corresponding to the target object based on the first measurement value and the calibration distance.

In this embodiment of this disclosure, matching is performed between the preview image of the target object and the calibration area in the shooting preview screen, the measurement value of the distance sensor at this time is obtained, and then the measurement value and the calibration distance are used to obtain the calibration offset corresponding to the target object. Therefore, according to the embodiments of this disclosure, a user can use any target object and obtain its calibration offset, and the obtaining method is simple, thereby reducing complexity of calibrating the distance sensor.

Optionally, the processor 910 is configured to use a difference between the first measurement value and the calibration distance as the calibration offset.

Optionally, the processor 910 is configured to obtain a second measurement value of the distance sensor; and obtain a calibrated second measurement value based on the second measurement value and the calibration offset.

Optionally, the processor 910 is configured to use a difference between the second measurement value and the calibration offset as the calibrated second measurement value.

Optionally, the processor 910 is configured to identify the target object; and obtain the calibration distance between the target object and the terminal device based on a correspondence between objects and calibration distances.

Optionally, the processor 910 is configured to identify the target object; and display, in the shooting preview screen, the calibration area that matches a shape of the target object.

Optionally, the processor 910 is configured to perform at least one of the following steps:
displaying first prompt information, where the first prompt information is used to prompt a user to move the target object so that the preview image coincides with the calibration area; and
displaying second prompt information, where the second prompt information is used to prompt the user to select a target object with preset characteristics.

It should be understood that in the embodiments of this disclosure, the radio frequency unit 901 may be configured to receive and transmit information or receive and transmit a signal in a call process. Specifically, the radio frequency unit 901 receives downlink data from a base station and transmits the downlink data to the processor 910 for processing; and transmits uplink data to the base station. Generally, the radio frequency unit 901 includes, but is not limited to, an antenna, at least one amplifier, a transceiver, a coupler, a low noise amplifier, a duplexer, and the like. In addition, the radio frequency unit 901 may further communicate with a network and other devices via a wireless communications system.

The terminal device provides a user with wireless broadband Internet access by using the network module 902, for example, helping a user transmit and receive emails, browse web pages, and access streaming media.

The audio output unit 903 can convert audio data received by the radio frequency unit 901 or the network module 902 or stored in the memory 909 into an audio signal, and output the audio signal into sound. In addition, the audio output unit 903 may further provide audio output (for example, call signal receiving sound or message receiving sound) related to a specific function performed by the terminal device 900. The audio output unit 903 includes a speaker, a buzzer, a telephone receiver, and the like.

The input unit 904 is configured to receive an audio or video signal. The input unit 904 may include a graphics processing unit (GPU) 9041 and a microphone 9042. The graphics processing unit 9041 processes image data of a static image or a video obtained by an image capturing apparatus (such as, a camera) in a video capturing mode or an image capturing mode. A processed image frame can be displayed on the display unit 906. The image frame processed by the graphics processing unit 9041 can be stored in the memory 909 (or another storage medium) or transmitted via the radio frequency unit 901 or the network module 902. The microphone 9042 may receive sound and can process such sound into audio data. The processed audio data may be converted in a telephone call mode into a format that can be transmitted by the radio frequency unit 901 to a mobile communication base station, for outputting.

The terminal device 900 further includes at least one sensor 905, for example, an optical sensor, a motion sensor, and another sensor. Specifically, the optical sensor includes an ambient light sensor and a proximity sensor, where the ambient light sensor can adjust brightness of the display panel 9061 based on intensity of ambient light, and the proximity sensor can turn off the display panel 9061 and/or backlight when the terminal device 900 moves close to an ear. As a type of motion sensor, an accelerometer sensor can detect magnitudes of accelerations in all directions (usually three axes), can detect a magnitude and a direction of gravity when the terminal device is in a static state, and can be applied to terminal device posture recognition (such as screen switching between portrait and landscape, related games, and magnetometer posture calibration), functions related to vibration recognition (such as pedometer and tapping), and the like. The sensor 905 may further include a fingerprint sensor, a pressure sensor, an iris sensor, a molecular sensor, a gyroscope, a barometer, a hygrometer, a thermometer, an infrared sensor, and the like. Details are not described herein.

The display unit 906 is configured to display information entered by a user or information provided for the user. The display unit 906 may include a display panel 9061, and the display panel 9061 may be configured in a form of liquid crystal display (LCD), organic light-emitting diode (OLED), or the like.

The user input unit 907 may be configured to receive entered digit or character information and generate key signal input that is related to user setting and function control of the terminal device. Specifically, the user input unit 907 includes a touch panel 9071 and other input devices 9072. The touch panel 9071 is also referred to as a touchscreen, and may collect a touch operation performed by a user on or near the touch panel 9071 (for example, an operation performed by a user on the touch panel 9071 or near the touch panel 9071 by using any proper object or accessory such as a finger or a stylus). The touch panel 9071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 910, and can receive and execute a command sent by the processor 910. In addition, the touch panel 9071 can be implemented in various types such as resistive, capacitive, infrared, and surface acoustic waves. The user input unit 907 may further include other input devices 9072 in addition to the touch panel 9071. Specifically, the other input devices 9072 may include but are not limited to a physical keyboard, a functional key (such as a volume control key or a power on/off key), a trackball, a mouse, and a joystick. Details are not described herein.

Further, the touch panel 9071 can cover the display panel 9061. After detecting a touch operation on or near the touch panel 9071, the touch panel 9071 transmits the touch operation to the processor 910 to determine a type of a touch event. Then, the processor 910 provides corresponding visual output on the display panel 9061 based on the type of the touch event. Although in FIG. 9, the touch panel 9071 and the display panel 9061 act as two independent components to implement input and output functions of the terminal device, in some embodiments, the touch panel 9071 and the display panel 9061 may be integrated to implement the input and output functions of the terminal device. This is not specifically limited herein.

The interface unit 908 is an interface connecting an external apparatus to the terminal device 900. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, and an earphone port. The interface unit 908 may be configured to receive an input (for example, data information and power) from the external apparatus and transmit the received input to one or more elements in the terminal device 900, or transmit data between the terminal device 900 and the external apparatus.

The memory 909 may be configured to store software programs and various data. The memory 909 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 909 may include a high-speed random access memory, and may further include a nonvolatile memory, for example, at least one magnetic disk storage device, a flash storage device, or another volatile solid-state storage device.

The processor 910 is a control center of the terminal device, and connects all parts of the entire terminal device by using various interfaces and lines. By running or executing a software program and/or a module stored in the memory 909 and invoking data stored in the memory 909, the processor 910 performs various functions of the terminal device and data processing, to perform overall monitoring on the terminal device. The processor 910 may include one or more processing units. Preferably, the processor 910 may integrate an application processor and a modem processor. The application processor mainly processes an operating system, a user interface, an application program, and the like. The modem processor mainly processes wireless communication. It may be understood that, alternatively, the modem processor may not be integrated into the processor 910.

The terminal device 900 may further include a power supply 911 (for example, a battery) that supplies power to various components. Preferably, the power supply 911 may be logically connected to the processor 910 through a power supply management system, to perform functions of managing charging, discharging, and power consumption through the power supply management system.

In addition, the terminal device 900 includes some functional modules that are not shown. Details are not described herein again.

Preferably, an embodiment of this disclosure further provides a terminal device, including a processor 910, a memory 909, and a computer program that is stored on the memory 909 and that can run on the processor 910. When the computer program is executed by the processor 910, the processes in the foregoing embodiments of the parameter obtaining method are implemented, with the same technical effect achieved. To avoid repetition, details are not described herein again.

An embodiment of this disclosure further provides a computer-readable storage medium. The computer-readable storage medium stores a computer program, and when the computer program is executed by a processor, the processes in the foregoing embodiments of the parameter obtaining method are implemented, with the same technical effect achieved. To avoid repetition, details are not described herein again. The computer-readable storage medium is, for example, a read-only memory (ROM), a random access memory (RAM) or an optical disc.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element defined by the statement "including a . . . " does not exclude another same element in a process, method, article, or apparatus that includes the element.

By means of the foregoing description of the implementations, a person skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of this disclosure essentially or the part contributing to the related art may be implemented in a form of a software product. The computer software product is stored in a storage medium (such as a ROM/RAM, a hard disk, or an optical disc), and includes several instructions for instructing a terminal device (which may be mobile phone, a computer, a server, an air conditioner, a network device, or the like) to perform the methods described in the embodiments of this disclosure.

The embodiments of this disclosure are described above with reference to the accompanying drawings, but this disclosure is not limited to the foregoing specific implementations. The foregoing specific implementations are only illustrative rather than restrictive. Under the enlightenment of this disclosure, a person of ordinary skill in the art can derive many forms, without departing from the purpose of this disclosure and the protection scope of the claims, all of which fall within the protection of this disclosure.

What is claimed is:

1. A parameter obtaining method, applied to a terminal device and comprising:
    obtaining a preview image of a target object in a shooting preview screen displayed by the terminal device;
    obtaining a first measurement value of a distance sensor when a degree of coincidence between the preview image and a calibration area in the shooting preview screen exceeds a threshold;
    when the degree of coincidence between the preview image and the calibration area in the shooting preview screen exceeds the threshold, obtaining, based on a pre-stored correspondence between objects and calibration distances, a calibration distance between the target object and the terminal device; and
    obtaining a calibration offset corresponding to the target object based on the first measurement value and the calibration distance,
    wherein the calibration area matches a shape of the target object, and the target object is selected by a user and provided with preset characteristics.

2. The method according to claim 1, wherein the obtaining a calibration offset corresponding to the target object based on the first measurement value and the calibration distance comprises:
    using a difference between the first measurement value and the calibration distance as the calibration offset.

3. The method according to claim 1, wherein after the obtaining a calibration offset corresponding to the target object, the method further comprises:

obtaining a second measurement value of the distance sensor; and obtaining a calibrated second measurement value based on the second measurement value and the calibration offset.

4. The method according to claim 3, wherein the obtaining a calibrated second measurement value based on the second measurement value and the calibration offset comprises:

using a difference between the second measurement value and the calibration offset as the calibrated second measurement value.

5. The method according to claim 1, wherein the obtaining a calibration distance between the target object and the terminal device comprises:

identifying the target object; and obtaining the calibration distance between the target object and the terminal device based on a correspondence between objects and calibration distances.

6. The method according to claim 1, wherein before the obtaining a preview image of a target object, the method further comprises:

identifying the target object; and displaying, in the shooting preview screen, the calibration area that matches a shape of the target object.

7. The method according to claim 1, wherein after the obtaining a preview image of a target object, the method further comprises at least one of the following:

displaying first prompt information, wherein the first prompt information is used to prompt the user to move the target object so that the preview image coincides with the calibration area; and displaying second prompt information, wherein the second prompt information is used to prompt the user to select the target object with the preset characteristics.

8. A terminal device, comprising a memory, a processor, and a computer program stored on the memory and capable of running on the processor, wherein when the computer program is executed by the processor, following steps are implemented:

obtaining a preview image of a target object in a shooting preview screen displayed by the terminal device;

obtaining a first measurement value of a distance sensor when a degree of coincidence between the preview image and a calibration area in the shooting preview screen exceeds a threshold;

when the degree of coincidence between the preview image and the calibration area in the shooting preview screen exceeds the threshold, obtaining, based on a pre-stored correspondence between objects and calibration distances, a calibration distance between the target object and the terminal device; and obtaining a calibration offset corresponding to the target object based on the first measurement value and the calibration distance, wherein the calibration area matches a shape of the target object, and the target object is selected by a user and provided with preset characteristics.

9. The terminal device according to claim 8, wherein the obtaining a calibration offset corresponding to the target object based on the first measurement value and the calibration distance comprises:

using a difference between the first measurement value and the calibration distance as the calibration offset.

10. The terminal device according to claim 8, wherein when the computer program is executed by the processor, following steps are further implemented: after the obtaining a calibration offset corresponding to the target object, obtaining a second measurement value of the distance sensor; and obtaining a calibrated second measurement value based on the second measurement value and the calibration offset.

11. The terminal device according to claim 10, wherein the obtaining a calibrated second measurement value based on the second measurement value and the calibration offset comprises:

using a difference between the second measurement value and the calibration offset as the calibrated second measurement value.

12. The terminal device according to claim 8, wherein the obtaining a calibration distance between the target object and the terminal device comprises:

identifying the target object; and obtaining the calibration distance between the target object and the terminal device based on a correspondence between objects and calibration distances.

13. The terminal device according to claim 8, wherein when the computer program is executed by the processor, following steps are further implemented: before the obtaining a preview image of a target object, identifying the target object; and displaying, in the shooting preview screen, the calibration area that matches a shape of the target object.

14. The terminal device according to claim 8, wherein when the computer program is executed by the processor, at least one of following steps are further implemented: after the obtaining a preview image of a target object, displaying first prompt information, wherein the first prompt information is used to prompt the user to move the target object so that the preview image coincides with the calibration area; and displaying second prompt information, wherein the second prompt information is used to prompt the user to select the target object with the preset characteristics.

15. A computer-readable storage medium, wherein the computer-readable storage medium stores a computer program, and when the computer program is executed by a processor, following steps are implemented:

obtaining a preview image of a target object in a shooting preview screen displayed by the terminal device;

obtaining a first measurement value of a distance sensor when a degree of coincidence between the preview image and a calibration area in the shooting preview screen exceeds a threshold;

when the degree of coincidence between the preview image and the calibration area in the shooting preview screen exceeds the threshold, obtaining, based on a pre-stored correspondence between objects and calibration distances, a calibration distance between the target object and the terminal device; and obtaining a calibration offset corresponding to the target object based on the first measurement value and the calibration distance, wherein the calibration area matches a shape of the target object, and the target object is selected by a user and provided with preset characteristics.

16. The computer-readable storage medium according to claim 15, wherein the obtaining a calibration offset corresponding to the target object based on the first measurement value and the calibration distance comprises:

using a difference between the first measurement value and the calibration distance as the calibration offset.

17. The computer-readable storage medium according to claim 15, wherein when the computer program is executed by the processor, following steps are further implemented: after the obtaining a calibration offset corresponding to the target object, obtaining a second measurement value of the distance sensor; and obtaining a calibrated second measurement value based on the second measurement value and the calibration offset.

18. The computer-readable storage medium according to claim 17, wherein the obtaining a calibrated second measurement value based on the second measurement value and the calibration offset comprises:

using a difference between the second measurement value and the calibration offset as the calibrated second measurement value.

19. The computer-readable storage medium according to claim 15, wherein the obtaining a calibration distance between the target object and the terminal device comprises:

identifying the target object; and obtaining the calibration distance between the target object and the terminal device based on a correspondence between objects and calibration distances.

20. The computer-readable storage medium according to claim 15, wherein when the computer program is executed by the processor, following steps are further implemented: before the obtaining a preview image of a target object, identifying the target object; and displaying, in the shooting preview screen, the calibration area that matches a shape of the target object.

* * * * *